United States Patent
Chen et al.

(10) Patent No.: US 9,108,700 B2
(45) Date of Patent: Aug. 18, 2015

(54) METHOD FOR AUTOMATIC ADJUSTMENT OF PEDELEC

(71) Applicants: DARFON ELECTRONICS (SUZHOU) CO., LTD., Suzhou, Jiangsu Province (CN); DARFON ELECTRONICS CORP., Taoyuan (TW)

(72) Inventors: Wen-Yen Chen, Taoyuan (TW); Jung-Chi Lai, Taoyuan (TW); Chun-Hsiung Yin, Taoyuan (TW)

(73) Assignees: DARFON ELECTRONICS (SUZHOU) CO., LTD., New District, Suzhou, Jiangsu Province (CN); DARFON ELECTRONICS CORP., Gueishan, Taoyuan (TW)

( * ) Notice: Subject to any disclaimer, the term of this patent is extended or adjusted under 35 U.S.C. 154(b) by 0 days.

(21) Appl. No.: 14/275,889

(22) Filed: May 13, 2014

(65) Prior Publication Data

US 2014/0336857 A1    Nov. 13, 2014

(30) Foreign Application Priority Data

May 13, 2013    (TW) .............................. 102116912 A

(51) Int. Cl.
- B62M 6/40 (2010.01)
- B62M 6/45 (2010.01)
- B62M 6/50 (2010.01)

(52) U.S. Cl.
CPC ...................................... B62M 6/45 (2013.01)

(58) Field of Classification Search
CPC combination set(s) only.
See application file for complete search history.

(56) References Cited

U.S. PATENT DOCUMENTS

| | | | |
|---|---|---|---|
| 5,024,286 A | 6/1991 | Lean | |
| 5,226,501 A | 7/1993 | Takata | |
| 5,370,200 A | 12/1994 | Takata | |
| 5,375,676 A | 12/1994 | Takata | |
| 5,777,442 A | 7/1998 | Miyata | |
| 5,819,867 A | 10/1998 | Matsumoto | |
| 5,922,035 A * | 7/1999 | Chen | 701/22 |
| 5,992,553 A | 11/1999 | Morrison | |
| 6,015,021 A | 1/2000 | Tanaka | |
| 6,247,548 B1 | 6/2001 | Hayashi | |
| 8,903,586 B2 * | 12/2014 | McVean | 701/22 |
| 2004/0206563 A1 | 10/2004 | Murata | |
| 2012/0012412 A1* | 1/2012 | Moeller et al. | 180/206.2 |
| 2012/0083956 A1 | 4/2012 | Aoki | |

FOREIGN PATENT DOCUMENTS

| | | |
|---|---|---|
| CN | 101633391 B | 3/2012 |
| EP | 1886913 A2 | 2/2008 |

* cited by examiner

*Primary Examiner* — Thomas Tarcza
*Assistant Examiner* — Edward Pipala
(74) *Attorney, Agent, or Firm* — Winston Hsu; Scott Margo

(57) ABSTRACT

A method for automatic adjustment of a pedelec having a first assist level and a second assist level includes the following steps. The pedelec is operated at an initial assist level. A pedal torque index is measured and compared with a predetermined numeric section having an upper threshold and a lower threshold. If the pedal torque index is within the predetermined numeric section, the pedelec is kept in operating at the initial assist level. If the pedal torque index is lower than the lower threshold, the pedelec is adjusted to operate at the second assist level. If the pedal torque index is higher than the upper threshold, the pedelec is adjusted to operate at the first assist level. Therein, auxiliary force provided by the pedelec at the second assist level is less than auxiliary force provided by the pedelec at the first assist level.

20 Claims, 8 Drawing Sheets

METHOD FOR AUTOMATIC ADJUSTMENT OF PEDELEC

BACKGROUND OF THE INVENTION

1. Field of the Invention

The invention relates to a method for adjustment of a pedelec, and especially relates to a method for automatic adjustment of a pedelec.

2. Description of the Prior Art

A pedelec (i.e. a type of e-bike) allows a rider to adjust an assist level according to different road conditions, so that the rider can get into an easy and comfortable riding. However, a common pedelec has numerous and complex assist levels which are performed usually in company with a gear transmission, so the rider has to know about the gear transmission, which increases the manipulation complexity and the loading in study. Furthermore, when the rider needs to manually adjust the assist level, the rider often neglect a current assist level of the pedelec, a speed, and a force applied to a pedal, which probably leads to a discomfort due to void pedaling or an inadequate assist level after an adjustment.

Therefore, for an improvement to the above problems, the invention provides a method capable of automatically adjusting an assist level of a pedelec.

SUMMARY OF THE INVENTION

The invention relates to a method of automatically switching a pedelec to operate at a proper assist level according to a current speed of the pedelec, a cadence of a pedal of the pedelec, a torque applied to the pedal by a rider and so on, so that a rider can experience an easy and comfortable riding.

An objective of the invention is to provide a method for automatic adjustment of a pedelec. The pedelec has a first assist level and a second assist level. Auxiliary force provided by the pedelec at the second assist level is less than auxiliary force provided by the pedelec at the first assist level. The method for automatic adjustment includes the following steps: operating the pedelec at an initial assist level; measuring a pedal torque index and comparing the pedal torque index with a predetermined numeric section that has an upper threshold and a lower threshold; if the pedal torque index is within the predetermined numeric section, keeping the pedelec in operating at the initial assist level; if the pedal torque index is lower than the lower threshold, adjusting the pedelec to operate at the second assist level; and if the pedal torque index is higher than the upper threshold, adjusting the pedelec to operate at the first assist level.

An objective of the invention is to provide a method for automatic adjustment of a pedelec. The pedelec is capable of outputting auxiliary force at a first assist level, a second assist level, and a third assist level selectively. The auxiliary force provided by the pedelec at the first assist level is larger than the auxiliary force provided by the pedelec at the second assist level. The auxiliary force provided by the pedelec at the second assist level is larger than the auxiliary force provided by the pedelec at the third assist level. A next lower level for the first assist level is the second assist level. A next lower level for the second assist level is the third assist level. The pedelec includes a pedal. A rotation path of the pedal has a first position and a second position. The pedelec has a current assist level parameter and a predetermined numeric section. The predetermined numeric section has an upper threshold and a lower threshold. The method for automatic adjustment includes the following steps. The method is to assign one of the first assist level and the second assist level to the current assist level parameter and to detect a pedal position of the pedal. When the pedal position is between the first position and the second position, the method is to measure and record an instant torque value, to assign the first assist level to the current assist level parameter if the instant torque value is higher than the upper threshold, and to maintain the current assist level parameter if the instant torque value is lower than the upper threshold. When the pedal position passes through the second position, the method is to determine a maximum torque value among a plurality of instant torque values measured and recorded during the pedal moving from the first position toward the second position, to adjust the current assist level parameter to the next lower level for the assist level that is assigned to the current assist level parameter if the maximum torque value is lower than the lower threshold, and to maintain the current assist level parameter if the maximum torque value is higher than the lower threshold.

An objective of the invention is to provide a method for automatic adjustment of a pedelec. The pedelec is capable of operating at a first assist level, a second assist level and a third assist level selectively. Auxiliary force provided by the pedelec at the first assist level is larger than auxiliary force provided by the pedelec at the second assist level. The auxiliary force provided by the pedelec at the second assist level is larger than auxiliary force provided by the pedelec at the third assist level. A next lower level for the first assist level is the second assist level. A next lower level for the second assist level is the third assist level. The pedelec has a pedal, a current assist level parameter, and a predetermined numeric section. The predetermined numeric section has an upper threshold and a lower threshold. The method for automatic adjustment includes the following steps: assigning one of the first assist level and the second assist level to the current assist level parameter; measuring a pedal torque index; comparing the pedal torque index with the upper threshold and assigning the first assist level to the current assist level parameter if the pedal torque index is higher than the upper threshold; comparing the pedal torque index with the lower threshold and adjusting the current assist level parameter to the next lower level for the assist level that is assigned to the current assist level parameter if the pedal torque index is lower than the lower threshold; and maintaining the current assist level parameter if the pedal torque index is higher than the lower threshold and lower than the upper threshold.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
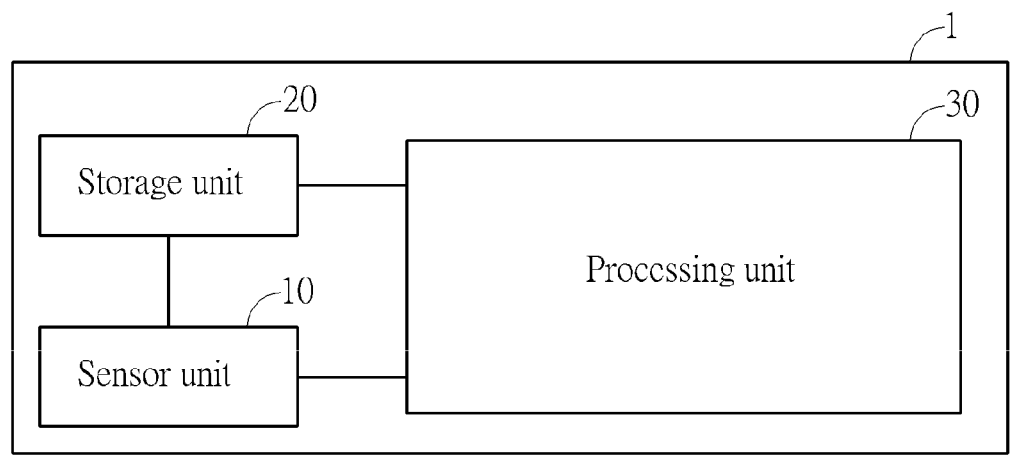
FIG. 1 is a function block diagram of an automatically-adjusting device of a pedelec of an embodiment according to the invention.

Please refer to FIG. 1, which is a function block diagram of an automatically-adjusting device 1 of a pedelec 100 of an embodiment according to the invention. The automatically-adjusting device 1 of the pedelec 100 includes a sensor unit 10, a storage unit 20, and a processing unit 30. The sensor unit 10 for example a sensing chip is used for sensing a traveling speed of the pedelec 100, a pedal position of a pedal of the pedelec 100, a rotating speed (or cadence) of the pedal, and a pedal torque index. The storage unit 20 for example a hard disk or a memory is used for recording pedal torque indices at different positions sensed by the sensor unit 10. The processing unit 30 for example is a processor or a controller chip is used for adjusting an assist level of the pedelec 100, determining the traveling speed of the pedelec 100 and the rotating speed of the pedal, and comparing the pedal torque indices at different positions with a predetermined numeric section. Then the processing unit 30 can adjust the assist level of the pedelec 100 according to the comparison result.

The above pedelec 100 can have a first assist level and a second assist level. Auxiliary force provided by the pedelec 100 at the second assist level being is than auxiliary force provided by the pedelec 100 at the first assist level. Furthermore, a method for automatic adjustment of a pedelec is implemented in the automatically-adjusting device 1 of the pedelec 100.

Figure 2A:
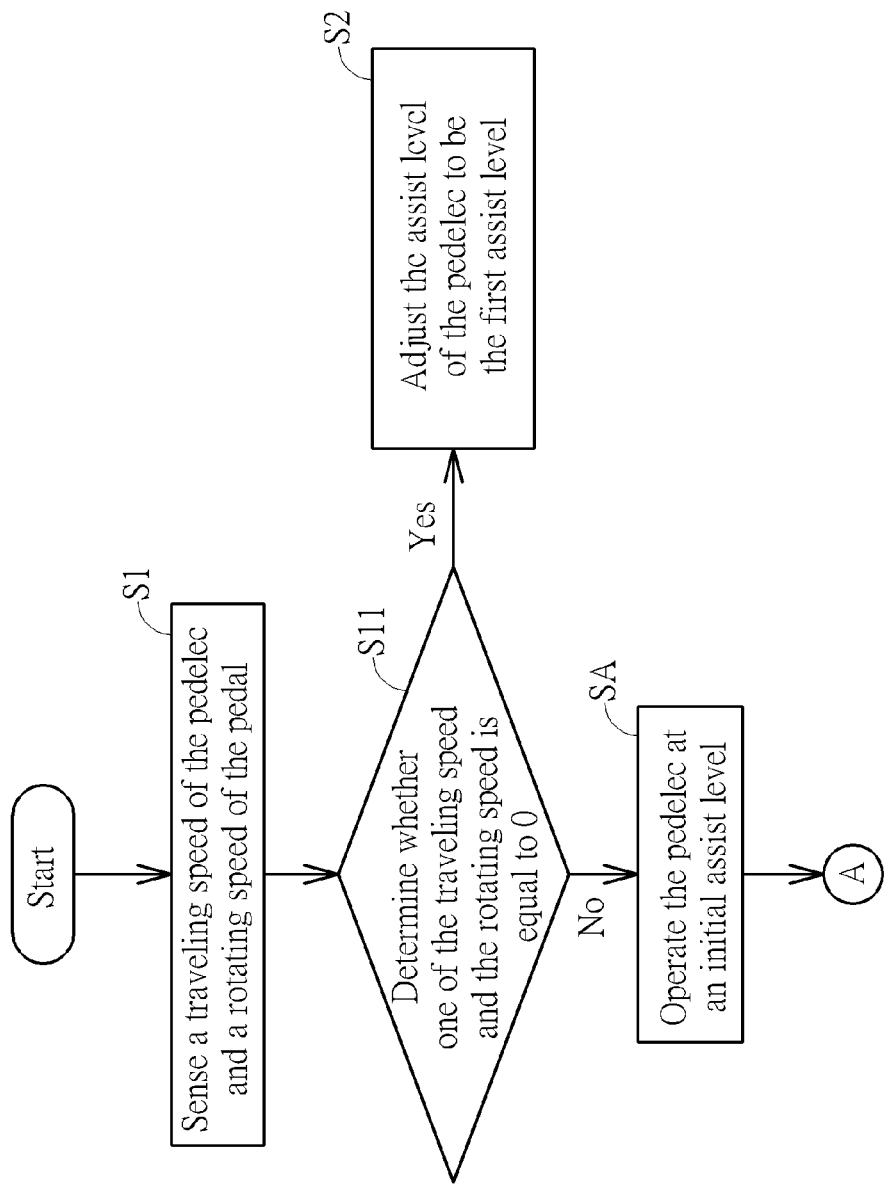
FIGS. 2A and 2B are a flow chart of the method for automatic adjustment of the pedelec of the embodiment according to the invention.
Figure 2B:
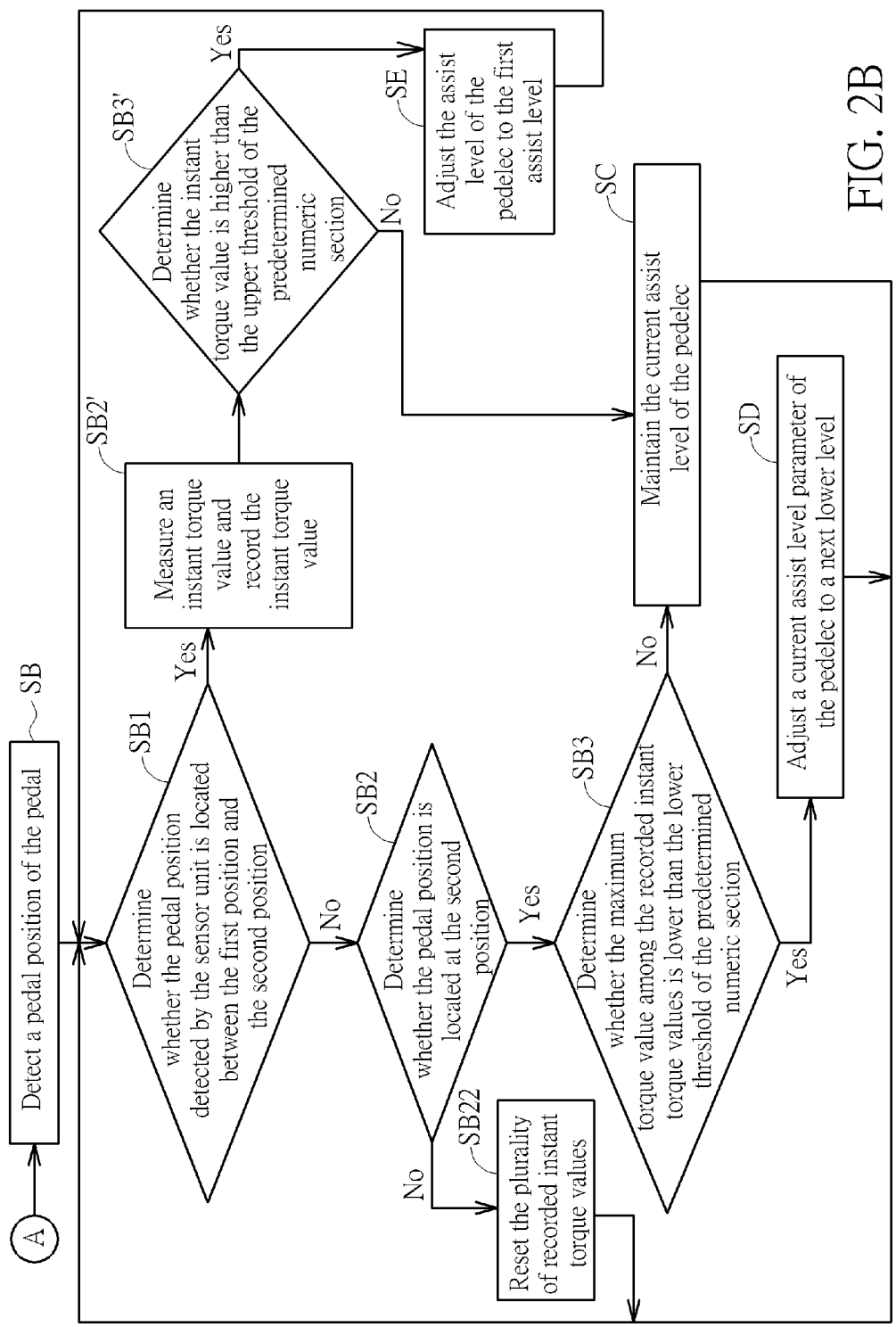

Please refer to FIGS. 2A and 2B, which are a flow chart of the method for automatic adjustment of the pedelec 100 of the embodiment according to the invention; therein, FIG. 2B follows FIG. 2A. The components of the pedelec 100 will be described in detail with the flow chart in the following. However, the steps in FIGS. 2A and 2B are not limited to be applied only to the pedelec 100 in FIG. 1; the pedelec 100 in FIG. 1 is not limited to use only the steps in FIGS. 2A and 2B either.

In the step S1, the sensor unit 10 senses a traveling speed of the pedelec 100 and a rotating speed of the pedal. The frequency for the sensor unit 10 to sense the traveling speed and the rotating speed is at least 20 times per second.

In the step S11, the processing unit 30 is used to determine whether one of the traveling speed and the rotating speed is equal to 0. If the traveling speed or the rotating speed is equal to 0, the step S2 is to be executed; if both the traveling speed and the rotating speed are larger than 0, the following step SA is to be executed.

In the step S2, the processing unit 30 adjusts the assist level of the pedelec 100 to be the first assist level. Then, the process flow of the method is back to the step S1. In an embodiment, the first assist level is a maximum assist level at which the pedelec 100 can provide maximum auxiliary force; that is, when the pedelec 100 is stationary (i.e. the traveling speed is equal to 0) or glides (i.e. the traveling speed is not equal to 0, but a rider does not pedal the pedal so that the rotating speed of the pedal is equal to 0), the processing unit 30 adjusts the assist level of the pedelec 100 to the maximum assist level.

In the step SA, the pedelec 100 is operated at an initial assist level, for example the first assist level or the second assist level. Then, the step SB is executed.

In the step SB, the sensor unit 10 detects a pedal position of the pedal. Then, the step SB1 is executed.

Figure 3:
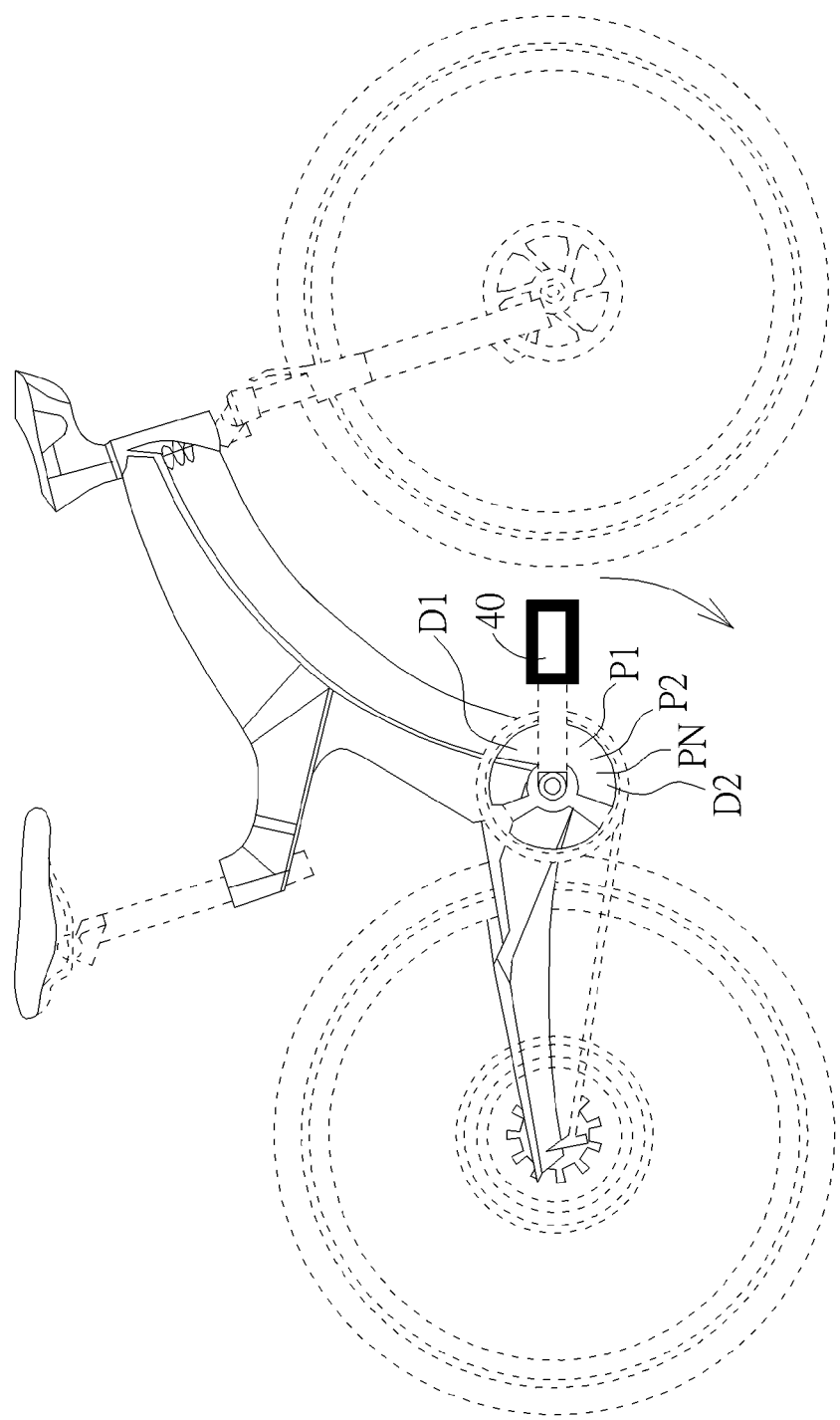
FIG. 3 is a schematic diagram illustrating positions of a pedal of the embodiment according to the invention.
Figure 4:
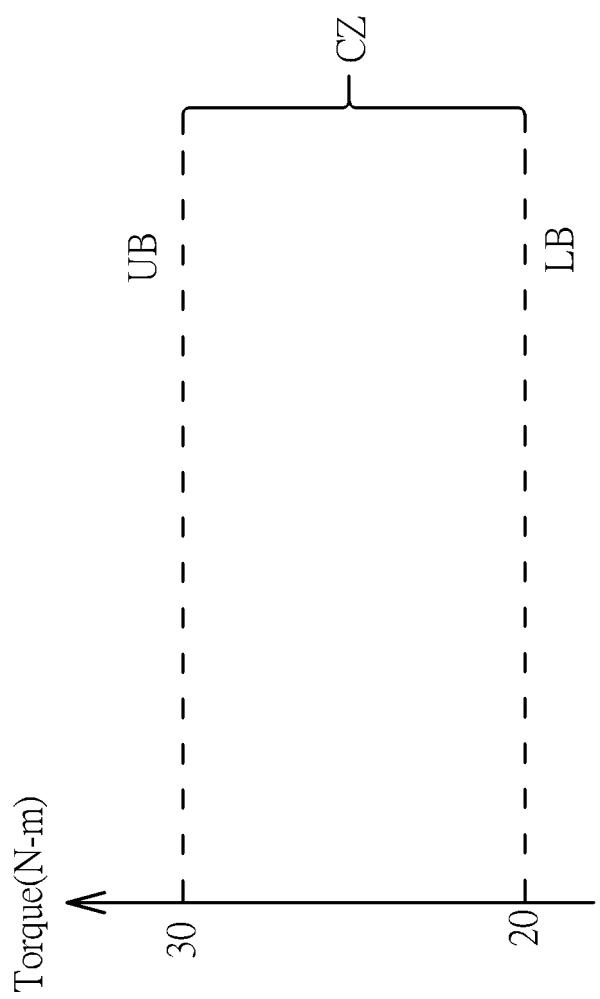
FIG. 4 is a schematic diagram illustrating a predetermined numeric section of the embodiment according to the invention.

In the following steps (including the steps SB1, SB2, SB22, SB2', SB3 and SB3'), the sensor unit 10 can measure a pedal torque index, and the pedal torque index is recorded in the storage unit 20. The pedal torque index recorded in the storage unit 20 is transmitted to the processing unit 30. The processing unit 30 compares the pedal torque index with a predetermined numeric section. The predetermined numeric section has an upper threshold UB and a lower threshold LB (shown in FIG. 4). FIG. 3 is a schematic diagram illustrating positions of the pedal 40 of the embodiment according to the invention. FIG. 4 is a schematic diagram illustrating the predetermined numeric section of the embodiment according to the invention. As shown by FIG. 3, the pedal 40 rotates clockwise. The rotation path of the pedal has a first position D1 and a second position D2. Therein, the pedal 40 will pass the first position D1 and then pass the second position D2. The pedal 40 in FIG. 3 is located between the first position D1 and the second position D2. The processing unit 30 compares the pedal torque indices with the predetermined numeric section in FIG. 4 according the different positions of the pedal 40.

In the step SB1, the method is to determine whether the pedal position detected by the sensor unit 10 is located between the first position and the second position. If the pedal position is located between the first position and the second position, the method is to execute the step SB2', or otherwise the method is to execute the step SB2. As shown by FIG. 3, the pedal 40 will pass the first position D1 and then reach the second position D2, so the process flow will execute the step SB2' at least one time prior to the step SB2.

In the step SB2', the sensor unit 10 measures an instant torque value corresponding to a current position of the pedal 40, and the instant torque value is recorded in the storage unit 20. For example, when the pedal 40 is located at the position P1, a measured instant torque value is F(P1); when the pedal 40 is located at the position P2, a measured instant torque value is F(P2); similarly, when the pedal 40 is located at the position PN, a measured instant torque value is F(PN). Then, the instant torque values F(P1), F(P2) . . . F(PN) are recorded in the storage unit 20. Then the method is to execute the step SB3'.

In the step SB3', the processing unit 30 compares the instant torque value measured at the current position with the upper threshold of the predetermined numeric section and determines whether the instant torque value is higher than the upper threshold of the predetermined numeric section. When the instant torque value is higher than the upper threshold of the predetermined numeric section, the step SE is to be executed, or else the step SC is to be executed. In other words, the measured instant torque value at the current position is to be a pedal torque index for the execution of the step SB3'.

In the step SE, the processing unit 30 adjusts the assist level of the pedelec 100 to the first assist level (i.e. the maximum assist level in the embodiment). Then, the process flow of the method is back to the step SB.

The step SC indicates that the pedal torque index is within the predetermined numeric section, so the processing unit 30 maintains the current assist level of the pedelec 100. If one of the following conditions is satisfied, the process flow of the method is get into the step SC: if (1) in the step SB3', the instant torque value is lower than the upper threshold of the predetermined numeric section, or (2) in the step SB3 later, a maximum torque value among the plurality of instant torque values measured during the pedal 40 moving from the first position D1 toward the second position D2 is higher than the lower threshold of the predetermined numeric section, the assist level of the pedelec 100 is maintained unchanged. Then, the process flow of the method is back to the step SB.

In the step SB2, the method is to determine whether the pedal position is located at the second position D2. When the pedal position is located at the second position D2, the step SB3 is to be executed, or else the step SB22 is to be executed.

The step SB22 indicates that the pedal has passed the second position, so the plurality of instant torque values recorded in the storage unit 20 is to be reset before the pedal enters the section of "the first position—the second position" again. Then, the process flow of the method is back to the step SB.

In step SB3, the processing unit 30 compares the maximum torque value among the plurality of instant torque values measured during the pedal 40 moving from the first position D1 toward the second position D2 with the lower threshold of the predetermined numeric section, and determines whether the maximum torque value among the instant torque values is lower than the lower threshold of the predetermined numeric section. If the maximum torque value among the instant torque values measured during the pedal 40 moving from the first position D1 toward the second position D2 is lower than the lower threshold of the predetermined numeric section, the step SD is to be executed, or otherwise the step SC is to be executed. In other words, the maximum torque value among the plurality of instant torque values measured during the pedal 40 moving from the first position D1 toward the second position D2 is to be a pedal torque index for the execution of the step SB3.

In the step SD, the processing unit 30 adjusts a current assist level parameter of the pedelec 100 to a next lower level. But the invention is not limited thereto. For example, it is assumed that the pedelec 100 has N-stage assist levels. If the current assist level of the pedelec 100 is the first assist level, the processing unit 30 adjusts the assist level of the pedelec 100 to the second assist level; if the current assist level of the pedelec 100 is the $N^{th}$ assist level, the processing unit 30 adjusts the assist level of the pedelec 100 to the $(N+1)^{th}$ stage assist level. Then, the process flow of the method is back to the step SB.

In an embodiment, the first position is same as the second position. That is, the step SD is executed once in every rotation cycle of the pedal.

As shown by FIG. 4, the predetermined numeric section is defined according to a comfort zone CZ for a rider during riding. The predetermined numeric section allows the rider to adjust the lower threshold and the upper threshold thereof, but an interval between the lower threshold and the upper threshold is preferably kept to be a constant torque difference, e.g. 10 N-m (i.e. newton meter). If a torque value measured by the sensor unit 10 is higher than the upper threshold UB of the comfort zone CZ, it indicates that the muscles in the legs of the rider suffer excessive loading, so it is needed to enhance the auxiliary force provided by the pedelec 100 by increasing the assist level of the pedelec 100. If a torque value measured by the sensor unit 10 is lower than the lower threshold LB of the comfort zone CZ, it indicates that the muscles in the legs of the rider suffer less loading leading to a discomfort due to void pedaling, so it is needed to reduce the auxiliary force provided by the pedelec 100 by decreasing the assist level of the pedelec 100.

However, every rider has a different body shape and muscle power, so every rider has a different feeling in comfort. Therefore, the invention allows the rider to adjust the lower threshold and the upper threshold of the predetermined numeric section by himself.

Figure 5:
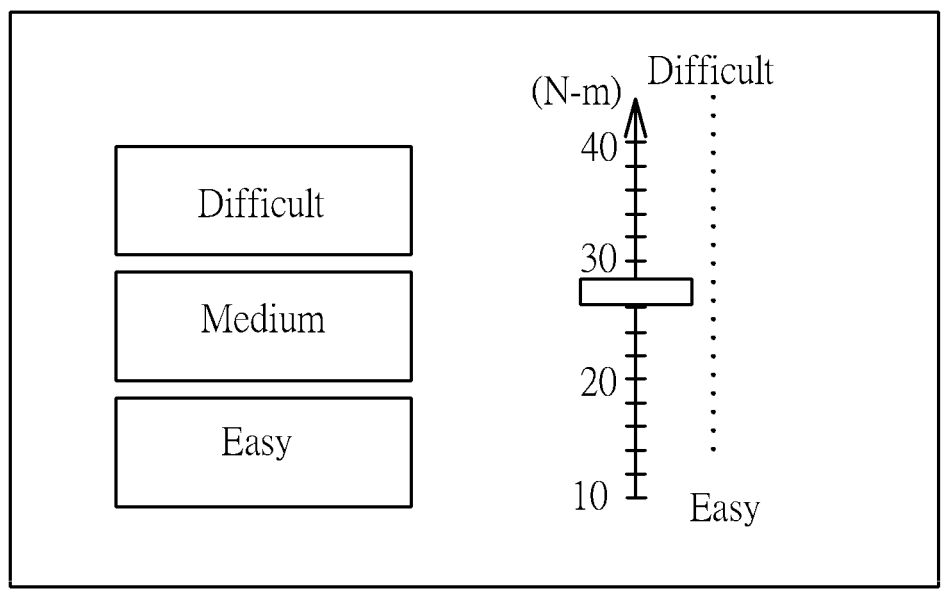
FIG. 5 is a schematic diagram illustrating a plurality of degrees of difficulty of the predetermined numeric section of the embodiment according to the invention.

FIG. 5 is a schematic diagram illustrating a plurality of degrees of difficulty of the predetermined numeric section of the embodiment according to the invention. Because the interval between the lower threshold and the upper threshold of the predetermined numeric section is kept to be a constant torque difference (e.g. 10 N-m), when the value domain of the predetermined numeric section is higher values, it is uneasy for the pedal torque index to be higher than the upper threshold of this predetermined numeric section. Therefore, in this case, it is difficult to increase the assist level of the pedelec 100. Furthermore, the pedal torque index tends to be lower than the lower threshold of the predetermined numeric section easily, so that the assist level of pedelec 100 tends to be reduced. In other words, in this case, the rider needs to apply more much force to the pedal 40 of the pedelec 100 for smooth riding.

On the contrary, when the value domain of the predetermined numeric section is lower, it is easy for the pedal torque index to be higher than the upper threshold of this predetermined numeric section, so that the assist level of the pedelec 100 is increased. Furthermore, it is uneasy for the pedal torque index to be lower than the lower threshold of the predetermined numeric section, so that the assist level of the pedelec 100 will not be decreased. In other words, in this case, the rider can ride smoothly just with applying quite less force to the pedal 40 of the pedelec 100.

Hence, as shown by FIG. 5, the invention allows the rider to set the predetermined numeric section to one of three levels: difficult, medium and easy. When the predetermined numeric section is set to be the easy level, the lower threshold and the upper threshold thereof can be 10 N-m and 20 N-m respectively. When the predetermined numeric section is set to be the medium level, the lower threshold and the upper threshold thereof can be 20 N-m and 30 N-m respectively. When the predetermined numeric section is set to be the difficult level, the lower threshold and the upper threshold thereof can be 30 N-m and 40 N-m respectively.

The rider can perform the above level adjustment of the predetermined numeric section by use of a human machine interface (HMI) on the pedelec 100 or a portable electronic device e.g. a smart phone, a tablet and so on.

The following are exemplary embodiments for further understanding of the method for automatic adjustment of a pedelec disclosed by to the invention. It is added that the exemplary embodiments are just specific instances according to the invention and are not used to limit the invention.

First Embodiment

Figure 6:
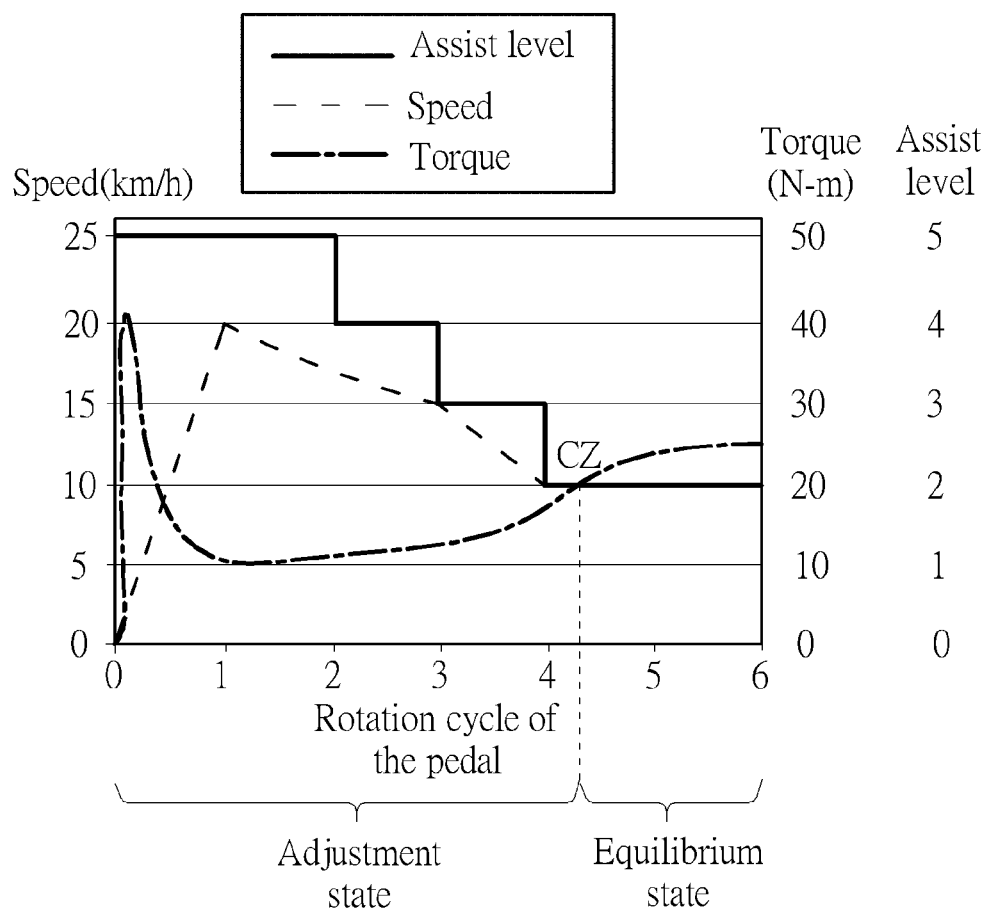
FIG. 6 is a schematic diagram illustrating varying of the assist level, the speed and a pedal torque of the pedelec relative to rotation cycles of a first embodiment according to the invention.

FIG. 6 is a schematic diagram illustrating varying of the assist level, the speed and a pedal torque of the pedelec of the first embodiment according to the invention. It is interpreted first that the pedelec of the first embodiment is to run on a horizontal ground, and the comfort zone CZ for the rider is from 20 N-m to 30 N-m. Therefore, the predetermined numeric section is set to the medium level (i.e. its lower threshold and its upper threshold are 20 N-m and 30 N-m respectively). The assist levels of the pedelec are classified into 6 levels: 0~$5^{th}$ levels. Therein, the 0 level presents that the pedelec provides no auxiliary force; the $5^{th}$ level presents that the pedelec provides the most auxiliary force. Counting of rotation cycles of the pedal starts from the time the pedelec is still stationary (i.e. the speed is equal to 0); therein, the pedal is located at the first position, and the count of the rotation cycles of the pedal is 0. When the pedal re-passes the first position at the first time, the count of the rotation cycles of the pedal is 1. When the pedal re-passes the first position at the second time, the count of the rotation cycles of the pedal is 2; and so forth.

As shown by FIG. 6, the pedelec starts from stationary. At first, a torque applied by the rider (or applied to the pedal) exceeds 40 N-m. At the time, the assist level of the pedelec is set to be the $5^{th}$ level, i.e. the maximum assist level. Because of the auxiliary force provided by the pedelec, the torque value decreases rapidly. When the count of the rotation cycles of the pedal is 1, because the maximum torque value measured during the count of the rotation cycles of the pedal being 0~1 is not lower than the lower threshold (20 N-m) of the predetermined numeric section, the assist level of the pedelec is still maintained to be the $5^{th}$ level. When the count of the rotation cycles of the pedal is 2, because the maximum torque value measured during the count of the rotation cycles of the pedal being 1~2 is lower than the lower threshold (20 N-m) of the predetermined numeric section, the assist level of the pedelec is adjusted downward to a next lower level so that the assist level is set to be the $4^{th}$ level. When the count of the rotation cycles of the pedal is 3, because the maximum torque value measured during the count of the rotation cycles of the pedal being 2~3 is lower than the lower threshold (20 N-m) of the predetermined numeric section, the assist level of the pedelec is adjusted downward to a next lower level so that the assist level is set to be the $3^{rd}$ level. When the count of the rotation cycles of the pedal is 4, because the maximum torque value measured during the count of the rotation cycles of the pedal being 3~4 is lower than the lower threshold (20 N-m) of the predetermined numeric section, the assist level of the pedelec is adjusted downward to a next lower level so that the assist level is set to be the $2^{nd}$ level. When the count of the rotation cycles of the pedal is 5 or 6, because the maximum torque value measured during the count of the rotation cycles of the pedal being 4~5 or 5~6 correspondingly is higher than the lower threshold (20 N-m) of the predetermined numeric section, and the torque values during the above periods are all within the predetermined numeric section (i.e. the comfort zone of 20 N-m to 30 N-m for the rider), the assist level of the pedelec is still maintained to be the $2^{nd}$ level.

As discussed above, during the period of the count of the rotation cycles of the pedal being 0~4, the torque is not steady within the predetermined numeric section (i.e. 20 N-m to 30 N-m), so the speed of the pedelec and the assist level of the pedelec are still under an adjustment state. During the period of the count of the rotation cycles of the pedal being 4~5, the torque exceeds the lower threshold (20 N-m) so as to get in the comfort zone for the rider. During the period of the count of the rotation cycles of the pedal being 5~6, the torque is steady within the predetermined numeric section, the speed of the pedelec and the assist level of the pedelec all tends to be constant. During the period from that the count of the rotation cycles of the pedal exceeds 4 and the torque enters the predetermined numeric section to that the count of the rotation cycles of the pedal reaches 6, the torque is steady within the predetermined numeric section, so the speed of the pedelec and the assist level of the pedelec are under an equilibrium state.

Second Embodiment

Figure 7:
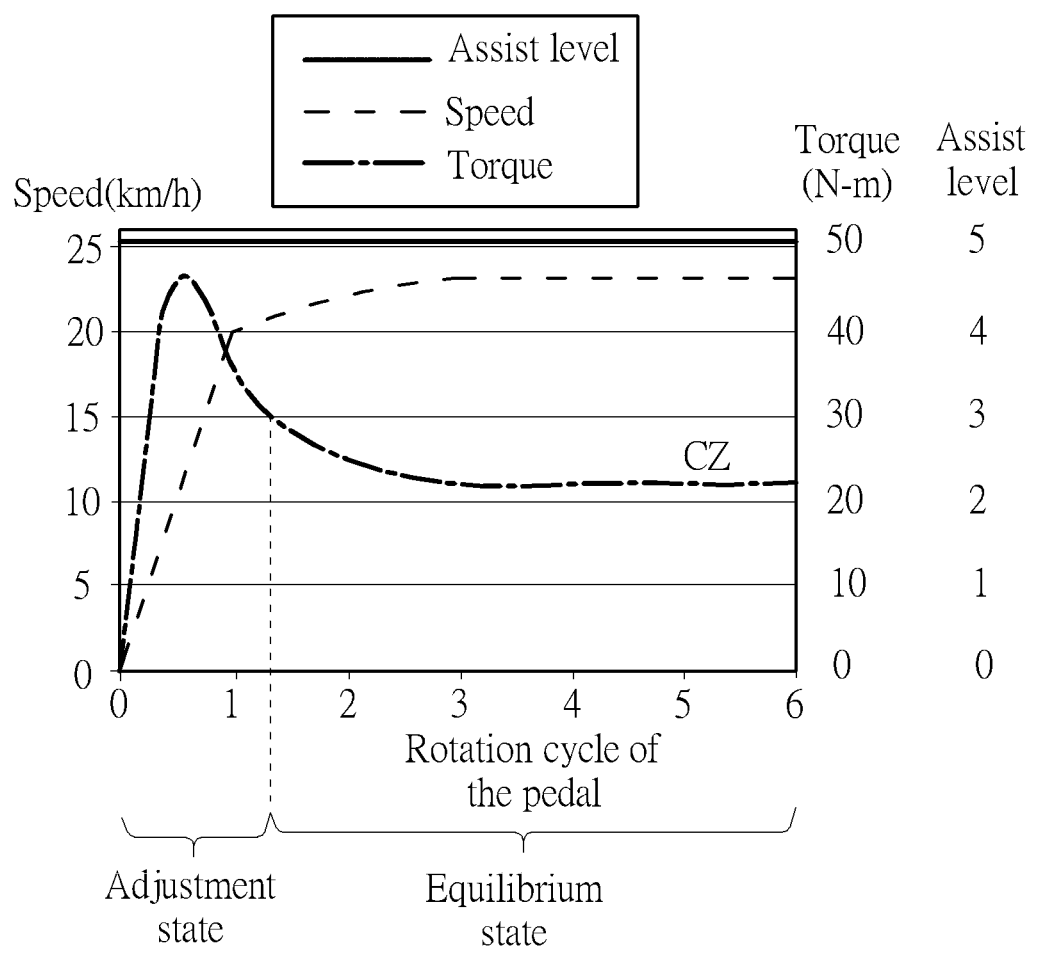
FIG. 7 is a schematic diagram illustrating varying of the assist level, the speed and a pedal torque of the pedelec relative to rotation cycles of a second embodiment according to the invention.

FIG. 7 is a schematic diagram illustrating varying of the assist level, the speed and a pedal torque of the pedelec of the second embodiment according to the invention. Similar to the first embodiment, the pedelec of the second embodiment is to run on a common ground, and the comfort zone CZ for the rider is from 20 N-m to 30 N-m. Therefore, the predetermined numeric section is set to the medium level (i.e. its lower threshold and its upper threshold are 20 N-m and 30 N-m respectively). The assist levels of the pedelec are classified into 6 levels: 0~5th levels. Therein, the 0 level presents that the pedelec provides no auxiliary force; the 5th level presents that the pedelec provides the most auxiliary force. Counting of rotation cycles of the pedal starts from the time the pedelec is still stationary (i.e. the speed is equal to 0); therein, the pedal is located at the first position, and the count of the rotation cycles of the pedal is 0. When the pedal re-passes the first position at the first time, the count of the rotation cycles of the pedal is 1. When the pedal re-passes the first position at the second time, the count of the rotation cycles of the pedal is 2; and so forth.

As shown by FIG. 7, the pedelec starts from stationary. At first, a torque applied by the rider (or applied to the pedal) exceeds 40 N-m. At the time, the assist level of the pedelec is set to be the 5th level, i.e. the maximum assist level. Because of the auxiliary force provided by the pedelec, the torque value starts to decrease. When the count of the rotation cycles of the pedal is 1, because the maximum torque value measured during the count of the rotation cycles of the pedal being 0~1 is not lower than the lower threshold (20 N-m) of the predetermined numeric section, and the torque values are still higher than the upper threshold (30 N-m) of the predetermined numeric section during the count of the rotation cycles of the pedal being 1, the assist level of the pedelec is still maintained to be the maximum assist level (i.e. the $5^{th}$ level). When the count of the rotation cycles of the pedal is 2, because the maximum torque value measured during the count of the rotation cycles of the pedal being 1~2 is not lower than the lower threshold (20 N-m) of the predetermined numeric section, the assist level of the pedelec is still maintained to be the $5^{th}$ level. When the count of the rotation cycles of the pedal is 3, 4, 5 or 6, because the maximum torque value measured during the count of the rotation cycles of the pedal being 2~3, 3~4, 4~5 or 5~6 correspondingly is higher than the lower threshold of the predetermined numeric section, and the torque values during the above periods are all within the predetermined numeric section (i.e. the comfort zone of 20 N-m to 30 N-m for the rider), the assist level of the pedelec is still maintained to be the $5^{th}$ level.

As discussed above, during the period of the count of the rotation cycles of the pedal being 0~1, the torque is not steady within the predetermined numeric section (i.e. 20 N-m to 30 N-m), so the speed of the pedelec and the assist level of the pedelec are still under an adjustment state. During the period from that the count of the rotation cycles of the pedal exceeds 1 and the torque enters the predetermined numeric section to that the count of the rotation cycles of the pedal reaches 6, the torque is steady within the predetermined numeric section, so the speed of the pedelec and the assist level of the pedelec tends to be constant, which shows an equilibrium state.

In addition, it can be understood based on the first and second embodiments above that the pedelec of each embodiment runs on a common ground, and the predetermined numeric section is set to be the medium level (i.e. the lower threshold and the upper threshold are 20 N-m and 30 N-m respectively). However, in the first embodiment, the rider rides the pedelec by a low gear ratio, so that the speed at the equilibrium state is relatively low (about 10 km/h); in the second embodiment, the rider rides the pedelec by a high gear ratio, so that the speed at the equilibrium state is relatively high (about 23 km/h).

As discussed above, the method for automatic adjustment of a pedelec of the invention not only is convenient for the rider to manipulate with less loading on the rider in learning, but also can automatically switch the pedelec to operate at a most proper assist level according to a current speed, a cadence of the pedal, pedaling torque and so on so that the rider can experience an easy and comfortable riding.

Those skilled in the art will readily observe that numerous modifications and alterations of the device and method may be made while retaining the teachings of the invention. Accordingly, the above disclosure should be construed as limited only by the metes and thresholds of the appended claims.

What is claimed is:

1. A method for automatic adjustment of a pedelec, the pedelec having a first assist level and a second assist level, auxiliary force provided by the pedelec at the second assist level being less than auxiliary force provided by the pedelec at the first assist level, the pedelec comprising a pedal, the method comprising the following steps:
    (A) operating the pedelec at an initial assist level;
    (B) measuring a pedal torque index and comparing the pedal torque index with a predetermined numeric range, the predetermined numeric range being defined between an upper threshold and a lower threshold, and the upper threshold is higher than the lower threshold;
    (C) if the pedal torque index is within the predetermined numeric range, keeping the pedelec in operating at the initial assist level;
    (D) if the pedal torque index is lower than the lower threshold, adjusting the pedelec to operate at the second assist level; and
    (E) if the pedal torque index is higher than the upper threshold, adjusting the pedelec to operate at the first assist level.

2. The method of claim 1, before the step (A), further comprising the following steps:
    (1) sensing a traveling speed of the pedelec and a rotating speed of the pedal;
    (2) if the traveling speed or the rotating speed is equal to 0, adjusting the pedelec to operate at the first assist level and returning back to the step (1); and
    (3) executing the steps (A) to (E) only when both the traveling speed and the rotating speed are larger than 0.

3. The method of claim 1, wherein a rotation path of the pedal has a first position and a second position, and the step (B) comprises the following steps:
    (B1) detecting a pedal position of the pedal;
    (B2) recording a plurality of instant torque values measured during the pedal moving from the first position toward the second position, and assigning a maximum torque value among the instant torque values as the pedal torque index; and
    (B3) when the pedal position passes through the second position, comparing the pedal torque index with the lower threshold and passing a result of the comparing to the step (D).

4. The method of claim 3, wherein the first position being same as the second position, the maximum torque value among the instant torque values in a rotation cycle of the pedal is assigned as the pedal torque index, and the step (D) is executed once in every rotation cycle of the pedal.

5. The method of claim 1, wherein a rotation path of the pedal has a first position and a second position, and the step (B) comprises the following steps:
    (B1') detecting a pedal position of the pedal;
    (B2') when the pedal position is between the first position and the second position, measuring an instant torque value, assigning the instant torque value as the pedal torque index, comparing the pedal torque index with the upper threshold, and passing a result of the comparing to the step (E); and
    (B3') re-detecting a pedal position of the pedal, and when the pedal position is still between the first position and the second position, returning back to the step (B2').

6. The method of claim 1, wherein the lower threshold and the upper threshold are capable of being adjusted by a user, and an interval between the lower threshold and the upper threshold is kept to be a constant torque difference.

7. A method for automatic adjustment of a pedelec, the pedelec being capable of outputting auxiliary force at a first assist level, a second assist level and a third assist level selectively, the auxiliary force provided by the pedelec at the first assist level being larger than the auxiliary force provided by the pedelec at the second assist level, the auxiliary force provided by the pedelec at the second assist level being larger than the auxiliary force provided by the pedelec at the third assist level, a next lower level for the first assist level being the second assist level, a next lower level for the second assist level being the third assist level, the pedelec comprising a pedal, a rotation path of the pedal having a first position and a second position, the pedelec having a current assist level parameter and a predetermined numeric range, the predetermined numeric range being defined between an upper threshold and a lower threshold, the upper threshold being higher than the lower threshold, the method comprising the following steps:
    (A) assigning one of the first assist level and the second assist level to the current assist level parameter;
    (B) detecting a pedal position of the pedal;
    (C) when the pedal position is between the first position and the second position,
        (C1) measuring and recording an instant torque value;
        (C2) if the instant torque value is higher than the upper threshold, assigning the first assist level to the current assist level parameter; and
        (C3) if the instant torque value is lower than the upper threshold, maintaining the current assist level parameter; and
    (D) when the pedal position passes through the second position,
        (D1) determining a maximum torque value among a plurality of instant torque values measured and recorded during the pedal moving from the first position toward the second position;
        (D2) if the maximum torque value is lower than the lower threshold, adjusting the current assist level parameter to the next lower level for the assist level that is assigned to the current assist level parameter; and
        (D3) if the maximum torque value is higher than the lower threshold, maintaining the current assist level parameter.

8. The method of claim 7, wherein the step (C) further comprises a step (C4) returning back to the step (B), and the step (D) further comprises a step (D4) returning back to the step (B).

9. The method of claim 7, before the step (A), further comprising the following steps:
    (1) sensing a traveling speed of the pedelec and a rotating speed of the pedal;
    (2) if the traveling speed or the rotating speed is equal to 0, assigning the first assist level to the current assist level parameter and returning back to the step (1); and
    (3) executing the steps (A) to (D) only when both the traveling speed and the rotating speed are larger than 0.

10. A method for automatic adjustment of a pedelec, the pedelec being capable of operating at a first assist level, a second assist level and a third assist level selectively, auxiliary force provided by the pedelec at the first assist level being larger than auxiliary force provided by the pedelec at the second assist level, the auxiliary force provided by the pedelec at the second assist level being larger than auxiliary force provided by the pedelec at the third assist level, a next lower level for the first assist level being the second assist level, a next lower level for the second assist level being the third assist level, the pedelec having a pedal, a current assist level parameter, and a predetermined numeric range, the predetermined numeric range being defined between an upper threshold and a lower threshold, the upper threshold being higher than the lower threshold, the method comprising the following steps:

(A) assigning one of the first assist level and the second assist level to the current assist level parameter;
(B) measuring a pedal torque index;
(C) comparing the pedal torque index with the upper threshold, and if the pedal torque index is higher than the upper threshold, assigning the first assist level to the current assist level parameter;
(D) comparing the pedal torque index with the lower threshold, and if the pedal torque index is lower than the lower threshold, adjusting the current assist level parameter to the next lower level for the assist level that is assigned to the current assist level parameter; and
(E) if the pedal torque index is higher than the lower threshold and lower than the upper threshold, maintaining the current assist level parameter.

11. The method of claim 10, a rotation path of the pedal having a first position and a second position, wherein the step (D) comprises the following steps:
(D1) detecting a pedal position of the pedal; and
(D2) when the pedal position passes through the second position, comparing the pedal torque index with the lower threshold.

12. The method of claim 11, wherein the step (B) comprises the following step:
(B1) recording a plurality of instant torque values measured during the pedal moving from the first position toward the second position, and assigning a maximum torque value among the instant torque values to the pedal torque index.

13. The method of claim 10, a rotation path of the pedal having a first position and a second position, wherein the steps (B) and (C) comprise the following steps:
(1) detecting a pedal position of the pedal;
(2) when the pedal position is between the first position and the second position, measuring an instant torque value, assigning the instant torque value to the pedal torque index, and comparing the pedal torque index with the upper threshold; and
(3) re-detecting a pedal position of the pedal, and when the pedal position is still between the first position and the second position, returning back to the step (2).

14. The method of claim 10, wherein in each rotation cycle of the pedal, an execution count for the step (D) is less than an execution count for the step (C).

15. The method of claim 10, wherein the lower threshold and the upper threshold are capable of being adjusted by a user, and an interval between the lower threshold and the upper threshold is kept to be a constant torque difference.

16. The method of claim 15, wherein the constant torque difference is 10 newton meter.

17. The method of claim 10, before the step (A), further comprising the following steps:
(1) sensing a rotating speed of the pedal;
(2) if the rotating speed is equal to 0, adjusting the pedelec to output at the first assist level and returning back to the step (1); and
(3) executing the steps (A) to (E) only when the rotating speed is larger than 0.

18. The method of claim 10, before the step (A), further comprising the following steps:
(1) sensing a traveling speed of the pedelec;
(2) if the traveling speed is equal to 0, adjusting the pedelec to output at the first assist level and returning back to the step (1); and
(3) executing the steps (A) to (E) only when the traveling speed is larger than 0.

19. The method of claim 17, wherein a frequency for sensing the rotating speed is at least 20 times per second.

20. The method of claim 18, wherein a frequency for sensing the traveling speed is at least 20 times per second.

* * * * *